(12) United States Patent  
Boon

(10) Patent No.: US 6,370,276 B2  
(45) Date of Patent: *Apr. 9, 2002

(54) IMAGE PREDICTIVE DECODING METHOD, IMAGE PREDICTIVE DECODING APPARATUS, IMAGE PREDICTIVE CODING METHOD, IMAGE PREDICTIVE CODING APPARATUS, AND DATA STORAGE MEDIA

(75) Inventor: Choong Seng Boon, Moriguchishi (JP)

(73) Assignee: Matsushita Electric Industrial Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,503

(22) Filed: Apr. 3, 1998

(30) Foreign Application Priority Data

Apr. 9, 1997 (JP) .............................. 9-090659

(51) Int. Cl.[7] .................................................. G06K 9/36
(52) U.S. Cl. ....................................... 382/238; 382/233
(58) Field of Search ................................. 382/232–253; 348/403–423; 375/240.01, 240.12, 240.13, 240.15, 240.2, 240.24, 240.25

(56) References Cited

U.S. PATENT DOCUMENTS

| | | | |
|---|---|---|---|
| 5,239,512 A | 8/1993 | Fautier et al. | 365/230.01 |
| 5,287,468 A | 2/1994 | Furuhashi et al. | 395/375 |
| 5,347,640 A | 9/1994 | You | 395/400 |
| 5,473,380 A | * 12/1995 | Tahara | 348/423 |
| 5,510,840 A | 4/1996 | Yonemitsu et al. | |
| 5,642,166 A | 6/1997 | Shin et al. | |

(List continued on next page.)

FOREIGN PATENT DOCUMENTS

| | | |
|---|---|---|
| DE | 195 06 372 A1 | 3/1996 |
| EP | 0 765 087 A2 | 3/1997 |
| GB | 2 296 839 | 7/1996 |
| JP | 61-18280 | 1/1986 |
| JP | 05 137130 | 6/1993 |
| JP | 08 154247 | 6/1996 |
| JP | 08 307875 | 11/1996 |
| WO | 99 21366 | 4/1999 |

OTHER PUBLICATIONS

"Motion Compensation and Predictive Coding"; The Society of Video Information Media, vol. 51, No. 12 (1997) 3–2, pp. 1976–1979.

"Motion Compensated Predictive Coding"; The Television Society, vol. 49, No. 4 (1995), pp. 444–449.

*Primary Examiner*—Phuoc Tran  
*Assistant Examiner*—Amir Alavi  
(74) *Attorney, Agent, or Firm*—Parkhurst & Wendel, L.L.P.

(57) ABSTRACT

Disclosed is an image predictive decoding method in which image data obtained by compressively coding a variable-size image using a prescribed method is input, a prediction image is generated using, as a reference image, at least one reproduced image which has been reproduced before an image being an object of decoding, and the object image is subjected to predictive decoding. In this method, the prediction image is generated using, as a reference image, at least one reproduced image which has been recently reproduced and includes significant image data to be referred to. Therefore, when plural objects constituting an image are subjected to compressive coding and transmitted object by object to increase the compression efficiency, it is avoided that a variable-size image which has already disappeared is used as the reference image for predictive decoding. As a result, coded data obtained by efficient compressive coding that suppresses the code quantity can be appropriately decoded.

2 Claims, 11 Drawing Sheets

U.S. PATENT DOCUMENTS

| | | | |
|---|---|---|---|
| 5,657,086 A | * 8/1997 | Tahara et al. | 348/412 |
| 5,706,053 A | 1/1998 | Urano | |
| 5,715,009 A | * 2/1998 | Tahara et al. | 348/423 |
| 5,717,441 A | 2/1998 | Serizawa et al. | |
| 5,727,088 A | * 3/1998 | Kim | 382/238 |
| 5,748,784 A | 5/1998 | Sugiyama | |
| 5,751,359 A | * 5/1998 | Suzuki et al. | 348/405 |
| 5,764,805 A | * 6/1998 | Martucci et al. | 382/238 |
| 5,768,433 A | * 6/1998 | Bolton | 382/238 |
| 5,825,421 A | * 10/1998 | Tan | 348/409 |
| 5,832,124 A | * 11/1998 | Sato et al. | 382/238 |
| 5,859,931 A | * 6/1999 | Fan et al. | 382/238 |
| 5,926,572 A | * 7/1999 | Kim et al. | 382/238 |
| 5,991,445 A | * 11/1999 | Kato | 382/232 |
| 5,991,447 A | * 11/1999 | Eifrig et al. | 382/236 |

* cited by examiner

IMAGE PREDICTIVE DECODING METHOD, IMAGE PREDICTIVE DECODING APPARATUS, IMAGE PREDICTIVE CODING METHOD, IMAGE PREDICTIVE CODING APPARATUS, AND DATA STORAGE MEDIA

FIELD OF THE INVENTION

The present invention relates to image predictive decoding and image predictive coding and, more particularly, to image predictive decoding methods, image predictive decoding apparatuses, image predictive coding methods, image predictive coding apparatuses, and data storage media, which are used for processing variable-size images.

BACKGROUND OF THE INVENTION

In order to store or transmit a digital image with high efficiency, it is necessary to compressively code the digital image. As a typical method for compressive coding of a digital image, there is DCT (Discrete Cosine Transformation) represented by JPEG (Joint Photographic Experts Group) and MPEG (Moving Picture Experts Group). Besides, there are waveform coding methods such as sub-band coding, wavelet coding, and fractal coding. Further, in order to eliminate a redundant signal between images, inter-image prediction using motion compensation is carried out, and a difference signal is subjected to waveform coding.

Here, an MPEG method based on motion compensation DCT will be described. Initially, an input image of one frame to be coded is divided into plural macroblocks each having the size of 16×16 pixels. Each macroblock is further divided into four blocks each having the size of 8×8 pixels, and each block of 8×8 pixels is subjected to DCT and quantization. This process is called "intra-frame coding".

On the other hand, using a motion detecting method such as block matching, from a frame temporarily adjacent to an object frame including an object macroblock to be quantized, a prediction macroblock having the smallest error from the object macroblock is detected, and motion compensation from the past image is carried out on the basis of the detected motion, thereby to obtain an optimum prediction block. A signal showing the motion toward the prediction macroblock having the smallest error is a motion vector. An image used as a reference for generating the prediction macroblock is called a reference image, hereinafter. Thereafter, a difference between the object block and the corresponding prediction block is obtained, and this difference is subjected to DCT to obtain a DCT coefficient. The DCT coefficient is quantized, and the quantized output is transmitted or stored together with the motion information. This process is called "inter-frame coding".

The inter-frame coding has two prediction modes: prediction from a previous image in the display order, and prediction from both of previous and future images. The former is called "forward prediction", and the latter is called "bidirectional prediction".

On the decoder end, after restoring the quantized DCT coefficient to the original difference signal, the prediction block is obtained on the basis of the difference signal and the motion vector, and the prediction block and the difference signal are added to reproduce the image. In this conventional technique, it is premised that the size of the reference image (an image used as a reference for generating a prediction image) is equal to the size of the object image.

In recent years, plural objects constituting an image (arbitrary shape images) are separately subjected to compressive coding and transmitted, thereby to improve the coding efficiency and to enable object by object reproduction. In coding and decoding of such arbitrary shape image, the size of the image changes very often. For example, a ball becomes smaller and smaller, till at last it disappears. Further, there is a case where the size of the image (object) becomes zero.

In ordinary predictive coding, a reference image is a reproduced image just before an object image which is currently being processed. When the size of the reference image is zero, since nothing is defined in the reference image, i.e., since the reference image has no significant image content data to be used for predictive coding, predictive coding cannot be carried out. In this case, there is no conventional way except the intra-frame coding. However, generally the intra-frame coding increases the quantity of coded data and reduces the compression efficiency. When an image disappears (image size=zero) and appears frequently in a sequence of motion picture, the coding efficiency is significantly degraded. For example, in a motion picture of flashing spotlight, when the light disappears and appears in image units, all the images of lights must be subjected to the intra-frame coding.

SUMMARY OF THE INVENTION

It is an object of the present invention to provide an image predictive decoding method, an image predictive decoding apparatus, an image predictive coding method, an image predictive coding apparatus, and a data storage medium, which can realize efficient predictive coding or decoding of a variable-size image even when the size of a reference image is zero or when the reference image is completely transparent.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an image predictive decoding method in which image data obtained by compressively coding a variable-size image using a prescribed method is input, a prediction image is generated using, as a reference image, at least one reproduced image which has been reproduced before an image being an object of decoding, and the object image is subjected to predictive decoding; wherein the prediction image is generated using, as a reference image, at least one reproduced image which has been recently reproduced and includes significant image content data to be referred to. In this method, when the size of the reference image (reproduced image) is zero, i.e., when the reference image is completely transparent, predictive decoding is carried out using another reproduced image of which size is not zero. Therefore, when plural objects constituting an image are subjected to compressive coding and transmitted object by object to increase the compression efficiency, it is avoided that a variable-size image which has already disappeared is used as the reference image for predictive decoding. As a result, coded data obtained by efficient compressive coding that suppresses the code quantity can be appropriately decoded.

According to a second aspect of the present invention, there is provided an image predictive decoding method in which image data obtained by compressively coding a variable-size image using a prescribed method is input, a prediction image is generated using, as a reference image, a prescribed image which has been reproduced before an image being an object of decoding, and the object image is subjected to predictive decoding; wherein, when the reproduced image used as a reference image has no significant coded data to be referred to, an image having a prescribed value as its image data is used as the prediction image. In this method, when the size of the reference image (reproduced image) is zero, i.e., when the reference image is completely transparent, predictive decoding is carried out using a prediction image having a prescribed value. Therefore, in addition to the above-mentioned effects, generation of the prediction image is facilitated.

According to a third aspect of the present invention, there is provided an image predictive decoding method in which image data obtained by compressively coding a variable-size image using a prescribed method is input, a prediction image is generated using a reference image, and an image being an object of decoding is subjected to predictive decoding; wherein the prediction image is generated using, as the reference image, at least one of two reproduced signals which have been recently reproduced, which one has significant image data to be referred to. Therefore, in the case where plural objects constituting an image are subjected to compressive coding and transmitted object by object, when a prediction image is generated using forward and backward reference images, it is avoided that variable-size images which have already disappeared are used as the reference images. As a result, coded data obtained by efficient compressive coding that suppresses the code quantity can be appropriately decoded.

According to a fourth aspect of the present invention, there is provided an image predictive decoding apparatus comprising input means to which image data obtained by compressively coding a variable-size image using a prescribed method is applied; a data analyzer which analyzes the image data and outputs the image size and the image transform coefficient; a decoder which restores the image transform coefficient to an expanded difference image using a prescribed method; a frame memory that contains a reproduced image; a prediction image generator that generates a prediction image using, as a reference image, the reproduced image stored in the frame memory; and an adder that generates a reproduced image by adding the expanded difference image and the prediction image, and outputs the reproduced image and, simultaneously, stores the reproduced image into the frame memory; wherein the prediction image generator examines whether or not the reproduced image includes significant image data to be referred to, and generates a prediction image using, as a reference image, at least one reproduced image which has been recently reproduced and includes significant image data. In this apparatus, when the size of the reference image (reproduced image) is zero, i.e., when the reference image is completely transparent, predictive decoding is carried out using another reproduced image of which size is not zero. Therefore, when plural objects constituting an image are subjected to compressive coding and transmitted object by object to increase the compression efficiency, it is avoided that a variable-size image which has already disappeared is used as the reference image for predictive decoding. As a result, coded data obtained by efficient compressive coding that suppresses the code quantity can be appropriately decoded.

According to a fifth aspect of the present invention, there is provided an image predictive decoding apparatus comprising input means to which image data obtained by compressively coding a variable-size image using a prescribed method is applied; a data analyzer which analyzes the image data and outputs the image size and the image transform coefficient; a decoder which restores the image transform coefficient to an expanded difference image using a prescribed method; a frame memory that contains a reproduced image; a prediction image generator that generates a prediction image using, as a reference image, a prescribed reproduced image stored in the frame memory and corresponding to the input image; and an adder that generates a reproduced image by adding the expanded difference image and the prediction image, and outputs the reproduced image and, simultaneously, stores the reproduced image into the frame memory; wherein the prediction image generator examines whether or not the prescribed reproduced image has significant image data to be referred to, and when the reproduced image has no significant coded data to be referred to, an image having a prescribed value as its image data is used as the prediction image. In this apparatus, when the size of the reference image (reproduced image) is zero, i.e., when the reference image is completely transparent, predictive decoding is carried out using a prediction image having a prescribed value. Therefore, in addition to the above-mentioned effects, generation of the prediction image is facilitated.

According to a sixth aspect of the present invention, there is provided an image predictive decoding apparatus comprising input means to which image data obtained by compressively coding a variable-size image using a prescribed method is applied; a data analyzer which analyzes the image data and outputs the image size and the image transform coefficient; a decoder which restores the image transform coefficient to an expanded difference image using a prescribed method; a frame memory that contains a reproduced image; a prediction image generator that generates a prediction image using the reproduced image stored in the frame memory as a reference image; and an adder that generates a reproduced image by adding the expanded difference image and the prediction image, and outputs the reproduced image and, simultaneously, stores the reproduced image into the frame memory; wherein the prediction image generator generates the prediction image using, as the reference image, at least one of two reproduced signals which have been recently reproduced, which one has significant image data to be referred to. Therefore, in the case where plural objects constituting an image are subjected to compressive coding and transmitted object by object, when a prediction image is generated using forward and backward reference images, it is avoided that variable-size images which have already disappeared are used as the reference images. As a result, coded data obtained by efficient compressive coding that suppresses the code quantity can be appropriately decoded.

According to a seventh aspect of the present invention, there is provided an image predictive coding method in which a variable-size image is input, a prediction image is generated using, as a reference image, at least one reproduced image which has been reproduced before an image being an object of coding, the object image is subtracted from the prediction image, and a difference between these images is compressively coded by a prescribed method; wherein the prediction image is generated using, as a reference image, at least one reproduced image which has been recently reproduced and includes significant image data to be referred to. In this method, when the size of the reference image (reproduced image) is zero, i.e., when the reference image is completely transparent, predictive coding is carried out using another reproduced image of which size is not zero. Therefore, when plural objects constituting an image are subjected to compressive coding and transmitted object by object to increase the compression efficiency, it is avoided that a variable-size image which has already disappeared is used as the reference image for predictive coding, resulting in a predictive coding method capable of efficient compressive coding that suppresses the code quantity.

According to an eighth aspect of the present invention, there is provided an image predictive coding method in which a variable-size image is input, a prediction image is generated using, as a reference image, a prescribed reproduced image which has been reproduced before an image being an object of coding, the object image is subtracted from the prediction image, and a difference between these images is compressively coded by a prescribed method; wherein, when the reproduced image used as a reference image has no significant image data to be referred to, an image having a prescribed value as its image data is used as the prediction image. In this method, when the size of the reference image (reproduced image) is zero, i.e., when the reference image is completely transparent, predictive coding is carried out using a prediction image having a prescribed value. Therefore, in addition to the above-mentioned effects, generation of the prediction image is facilitated.

According to a ninth aspect of the present invention, there is provided an image predictive coding method in which a variable-size image is input, a prediction image is generated using a reference image, an object image being an object of coding is subtracted from the prediction image, and a difference between these images is compressively coded by a prescribed method; wherein the prediction image is generated using, as the reference image, at least one of two reproduced images which has been recently reproduced and includes significant image data to be referred to. Therefore, in the case where plural objects constituting an image are subjected to compressive coding and transmitted object by object, when a prediction image is generated using forward and backward reference images, it is avoided that variable-size images which have already disappeared are used as the reference images, resulting in a predictive coding method capable of efficient compressive coding that suppresses the code quantity.

According to a tenth aspect of the present invention, there is provided an image predictive coding apparatus comprising input means to which data of a variable-size image is input, which data is divided into units subjected to coding; a subtracter that obtains a difference image between an object image being an object of coding and a prediction image corresponding to the object image; a compressive encoder that converts the difference image to compressed data by a prescribed compressive coding process; a variable-length encoder that performs variable-length coding of the compressed data and outputs coded data; an expansive decoder that restores the compressed data to an expanded difference image by a prescribed expansive decoding process; a frame memory that contains a reproduced image; a prediction image generator that generates a prediction image using the reproduced image stored in the frame memory as a reference image; and an adder that generates a reproduced image by adding the expanded difference image and the prediction image, and outputs the reproduced image and, simultaneously, stores the reproduced image into the frame memory; wherein the prediction image generator examines whether or not the reproduced image has significant image data to be referred to, and generates the prediction image using, as a reference image, at least one reproduced image which has been recently reproduced and includes significant image data. In this apparatus, when the size of the reference image (reproduced image) is zero, i.e., when the reference image is completely transparent, predictive coding is carried out using another reproduced image of which size is not zero. Therefore, when plural objects constituting an image are subjected to compressive coding and transmitted object by object to increase the compression efficiency, it is avoided that a variable-size image which has already disappeared is used as the reference image for predictive coding, resulting in a predictive coding apparatus capable of efficient compressive coding that suppresses the code quantity.

According to an eleventh aspect of the present invention, there is provided an image predictive coding apparatus comprising input means to which data of a variable-size image is input, which data is divided into units subjected to coding; a subtracter that obtains a difference image between an object image being an object of coding and a prediction image corresponding to the object image; a compressive encoder that converts the difference image to compressed data by a prescribed compressive coding process; a variable-length encoder that performs variable-length coding of the compressed data and outputs coded data; an expansive decoder that restores the compressed data to an expanded difference image by a prescribed expansive decoding process; a frame memory that contains a reproduced image; a prediction image generator that generates a prediction image using the reproduced image stored in the frame memory as a reference image; and an adder that generates a reproduced image by adding the expanded difference image and the prediction image, and outputs the reproduced image and, simultaneously, stores the reproduced image into the frame memory; wherein the prediction image generator examines whether or not the reproduced image has significant image data to be referred to and, when the reproduced image has no significant image data, an image having a prescribed value as its image data is used as the prediction image. In this apparatus, when the size of the reference image (reproduced image) is zero, i.e., when the reference image is completely transparent, predictive coding is carried out using a prediction image having a prescribed value. Therefore, in addition to the above-mentioned effects, generation of the prediction image is facilitated.

According to a twelfth aspect of the present invention, there is provided an image predictive coding apparatus comprising input means to which data of a variable-size image is input, which data is divided into units subjected to coding; a subtracter that obtains a difference image between an object image being an object of coding and a prediction image corresponding to the object image; a compressive encoder that converts the difference image to compressed data by a prescribed compressive coding process; a variable-length encoder that performs variable-length coding of the compressed data and outputs coded data; an expansive decoder that restores the compressed data to an expanded difference image by a prescribed expansive decoding process; a frame memory that contains a reproduced image; a prediction image generator that generates a prediction image using the reproduced image stored in the frame memory as a reference image; and an adder that generates a reproduced image by adding the expanded difference image and the prediction image, and outputs the reproduced image and, simultaneously, stores the reproduced image into the frame memory; wherein the prediction image generator generates the prediction image using, as the reference image, at least one of two reproduced signals which have been recently reproduced, which one has significant image data to be referred to. Therefore, in the case where plural objects constituting an image are subjected to compressive coding and transmitted object by object, when a prediction image is generated using forward and backward reference images, it is avoided that variable-size images which have already disappeared are used as the reference images, resulting in a predictive coding apparatus capable of efficient compressive coding that suppresses the code quantity.

According to a thirteenth aspect of the present invention, there is provided an image predictive coding apparatus comprising input means to which data of a variable-size image is input, which data is divided into units subjected to coding; a subtracter that obtains a difference image between an object image being an object of coding and a prediction image corresponding to the object image; a compressive encoder that converts the difference image to compressed data by a prescribed compressive coding process; a variable-length encoder that performs variable-length coding of the compressed data and outputs coded data; an expansive decoder that restores the compressed data to an expanded difference image by a prescribed expansive decoding process; a frame memory that contains a reproduced image; a prediction image generator that generates a prediction image using the reproduced image stored in the frame memory as a reference image; an adder that generates a reproduced image by adding the expanded difference image and the prediction image, and outputs the reproduced image and, simultaneously, stores the reproduced image into the frame memory; and a shape detector that detects whether the reproduced image includes significant image data to be referred to or not, on the basis of shape data showing the shape of an object and included in the variable-size image data; wherein the prediction image generator receives an output from the shape detector and, when the reproduced image has no significant image data, the prediction image generator generates the prediction image using, as a reference image, at least one reproduced image which has been recently reproduced and includes significant image data. In this apparatus, when it is detected by the shape detector that the input shape signal has a shape, the shape signal is subjected to predictive coding and, when the input shape signal has no shape, the shape signal is not subjected to predictive coding. Therefore, when plural objects constituting an image are subjected to compressive coding and transmitted object by object, it is avoided that a variable-size image which has already disappeared is used as a reference image for predictive coding, resulting in a predictive coding apparatus capable of efficient compressive coding that suppresses the code quantity.

According to a fourteenth aspect of the present invention, there is provided a data storage medium that contains a program for implementing a predictive decoding process by a computer, wherein the program is constructed so that the computer executes an image predictive decoding process according to any of the above-described image predictive decoding apparatuses. Therefore, it is possible to realize, by software, a predictive decoding process that can decode coded data obtained by efficient compressive coding that suppresses the code quantity.

According to a fifteenth aspect of the present invention, there is provided a data storage medium that contains a program for implementing a predictive coding process by a computer, wherein the program is constructed so that the computer executes an image predictive coding process according to any of the above-described image predictive coding apparatuses. Therefore, it is possible to realize, by software, a predictive coding process capable of efficient compressive coding that suppresses the code quantity.

According to a sixteenth aspect of the present invention, there is provided a data storage medium that contains a program for implementing a predictive coding process by a computer, wherein the program is constructed so that the computer executes an image predictive coding process according to any of the above-described image predictive coding apparatuses. Therefore, it is possible to realize, by software, a predictive coding process capable of efficient compressive coding that suppresses the code quantity.

DETAILED DESCRIPTION OF THE PREFERRED EMBODIMENTS

Embodiment 1

Figure 1:
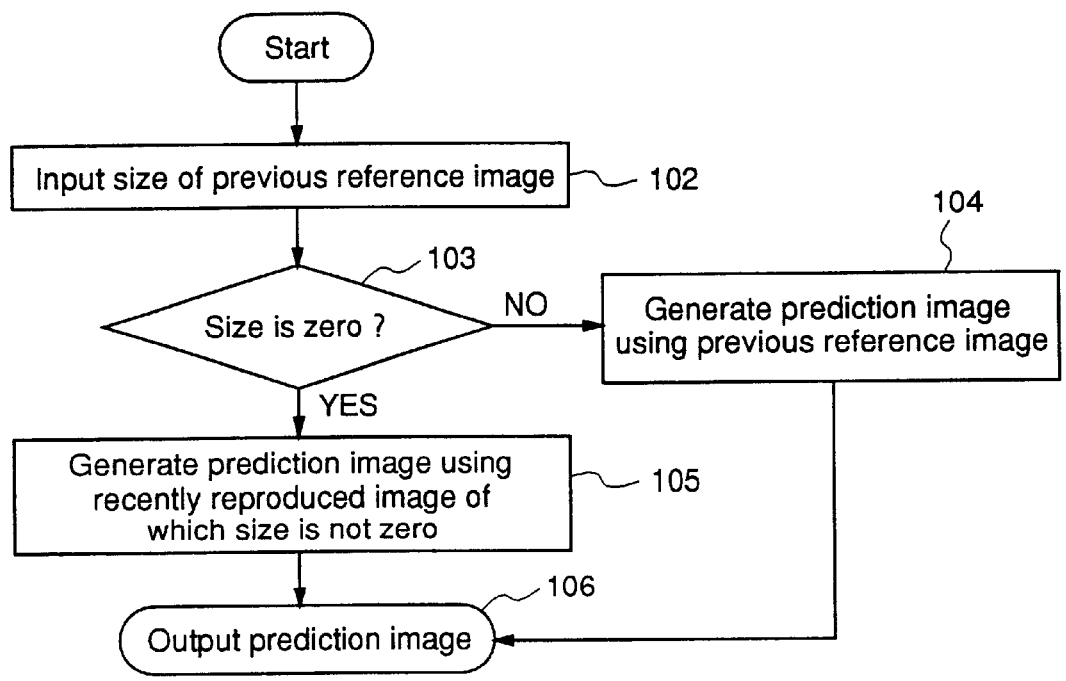
FIG. 1 is a flowchart of a prediction image generation process in an image predictive decoding method according to a first embodiment of the present invention.

FIG. 1 is a flowchart of a prediction image generation process in an image predictive decoding method according to a first embodiment of the present invention. Before explaining FIG. 1, an image prediction method according to this first embodiment will be described using FIGS. 2(a) and 2(b).

The size of an input image used in the image predictive decoding method of this first embodiment is variable, and it may happen that the size becomes zero.

Figure 2:
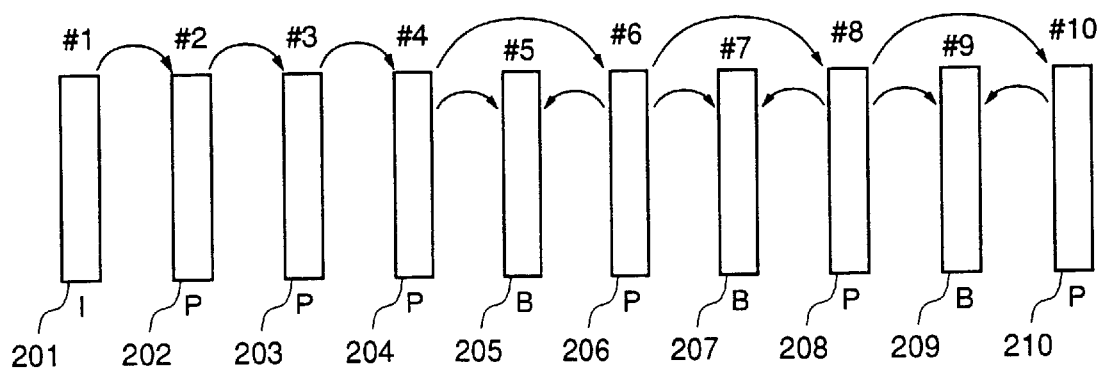
FIGS. 2(a) and 2(b) are schematic diagrams for explaining image prediction in the image predictive decoding method according to the present invention.
Figure 2:
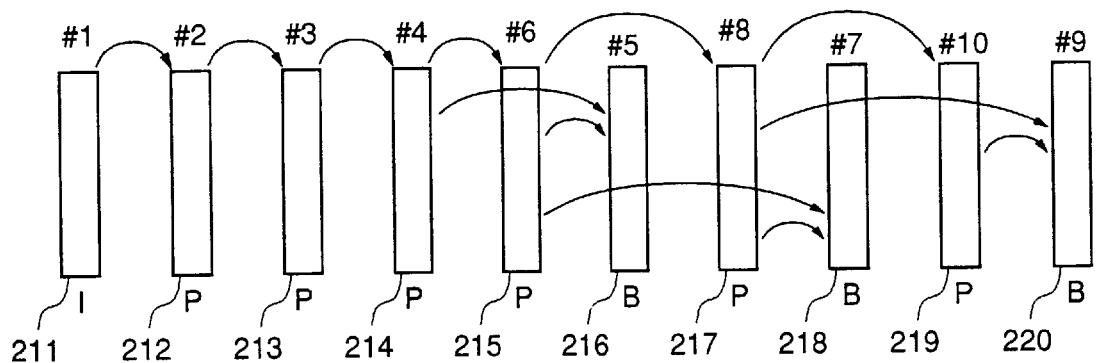

FIG. 2(a) shows images 201~210 of a motion picture, which are arranged in the display order. The image 201 is the first frame to be displayed, followed by 202, 203, . . . , and this order is shown by #1~#10. Since the image #1 (201) is the first image, it is subjected to intra-frame coding. In this first embodiment, an image (one frame) is divided into plural blocks each having the size of 8×8 pixels, and each block of 8×8 pixels is subjected to DCT and quantization. The quantized coefficient is subjected to variable-length coding. In decoding, the coded data obtained by the variable-length coding is subjected to variable-length decoding, and the quantized coefficient obtained by the variable-length decoding is subjected to inverse quantization and inverse DCT, thereby reproducing the image. Next, the image #2 (202) is subjected to inter-frame predictive coding by referring to the reproduced image #1 (201).

In this first embodiment, using block matching as a motion detection method, a prediction block having the smallest error from the object block currently being processed is detected from the image #1 (201). On the basis of the detected motion from the object block toward the prediction block, an optimum prediction block is obtained by motion compensation of the object block from the reproduced image #1 (201). Next, a difference between the object block and the corresponding prediction block is obtained, and the difference is subjected to DCT. The DCT coefficient is quantized, and the quantized output is transmitted or stored together with the motion information. The reproduced image #1 (201) serves as a reference image for the image #2 (202). This prediction is called "forward prediction". In decoding, the prediction block is added to the difference which has been subjected to inverse quantization and inverse DCT, thereby reproducing the image.

In like manner, the image #3 (203) and the image #4 (204) are subjected to predictive coding using reference images shown by the arrows. Like the images #6 (206), #8 (208) and #10 (210), prediction may be carried out from a previous image but one. In contrast with the forward prediction, like the images #5 (205), #7 (207) and #9 (209), prediction may be carried out by referring to a future image to be displayed after the object image. This prediction is called "backward prediction". When both the forward prediction and the backward prediction are carried out, this is called "bidirectional prediction". The bidirectional prediction has three modes: forward prediction mode, backward prediction mode, interpolation mode for balancing the forward prediction and the backward prediction.

FIG. 2(b) shows the transmission order, i.e., decoding order, of the images predicted as shown in FIG. 2(a).

The image #1 (211) is initially decoded and reproduced. Referring to the reproduced image #1, the image #2 (212) is decoded. With respect to the bidirectional prediction image like the image #5 (216), the reference images used for the prediction have to be decoded and reproduced before the prediction image. Therefore, the image #6 (215) is decoded before the image #5 (216). Likewise, the image #8 (217) and the image #10 (219) are transmitted, decoded and reproduced before the image #7 (218) and the image #9 (220), respectively.

Figure 7:
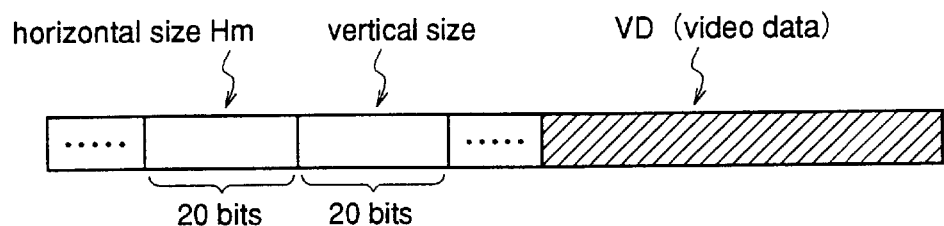
FIG. 7 is a diagram showing image data according to the first embodiment of the invention.

When transmitting a variable-size image, the size of the image must be transmitted. In this first embodiment, the image size is described at the head of the coded data of the image, and the horizontal and vertical sizes Hm and Vm are shown by 20 bits each. FIG. 7 shows coded image data (VD) according to this first embodiment, and the coded data includes the motion vector, the quantization width, and the DCT coefficient, in addition to the horizontal and vertical sizes Hm and Vm.

Next, a description is given of the prediction image generation process in the image predictive decoding method according to the first embodiment.

In order to generate a prediction image, initially, the size of the previous reference image is input (step 102), and it is examined whether the size of the reference image is zero or not (step 103).

In the decoding order shown in FIG. 2(b), a reference image always exists before an image being an object of decoding (in coding, an object of coding). That is, the reference image is a most recently reproduced image in the predictive decoding method of this first embodiment. For example, in FIG. 2(b), a reference image for the image #4 (214) is the image #3 (213). However, an image reproduced by bidirectional prediction cannot be used for prediction, so that this image cannot be a reference image. Therefore, for example, a reference image for the image #8 (217) is the image #6 (215).

When it is decided in step 103 that the size of the reference mage is not zero, step 104 follows, wherein a prediction image is generated using the reference image. On the other hand, when it is detected in step 103 that the size of the reference image is zero, step 105 follows, wherein a prediction image is generated using, as a reference image, a recently reproduced image of which size is not zero. The way of detecting a recently reproduced image of which size is not zero will be described hereinafter using FIG. 2(b).

In the case of generating a prediction image of the image #4 (214), a first frame, it is assumed that the size of the image #3 (213), a second frame, just before the image #4 (214) is zero, and the size of the image #2 (212), a third frame is not zero. In this case, a prediction image of the image #4 (214) is generated by referring to the image #2 (212). Likewise, in the case of generating a prediction image of the image #6 (215), assuming that the sizes of the images #3 (213) and #4 (214) are zero, the prediction image is generated by referring to the image #2 (212). This first embodiment employs block by block motion compensation as a method for generating a prediction image, like MPEG1.

Figure 3:
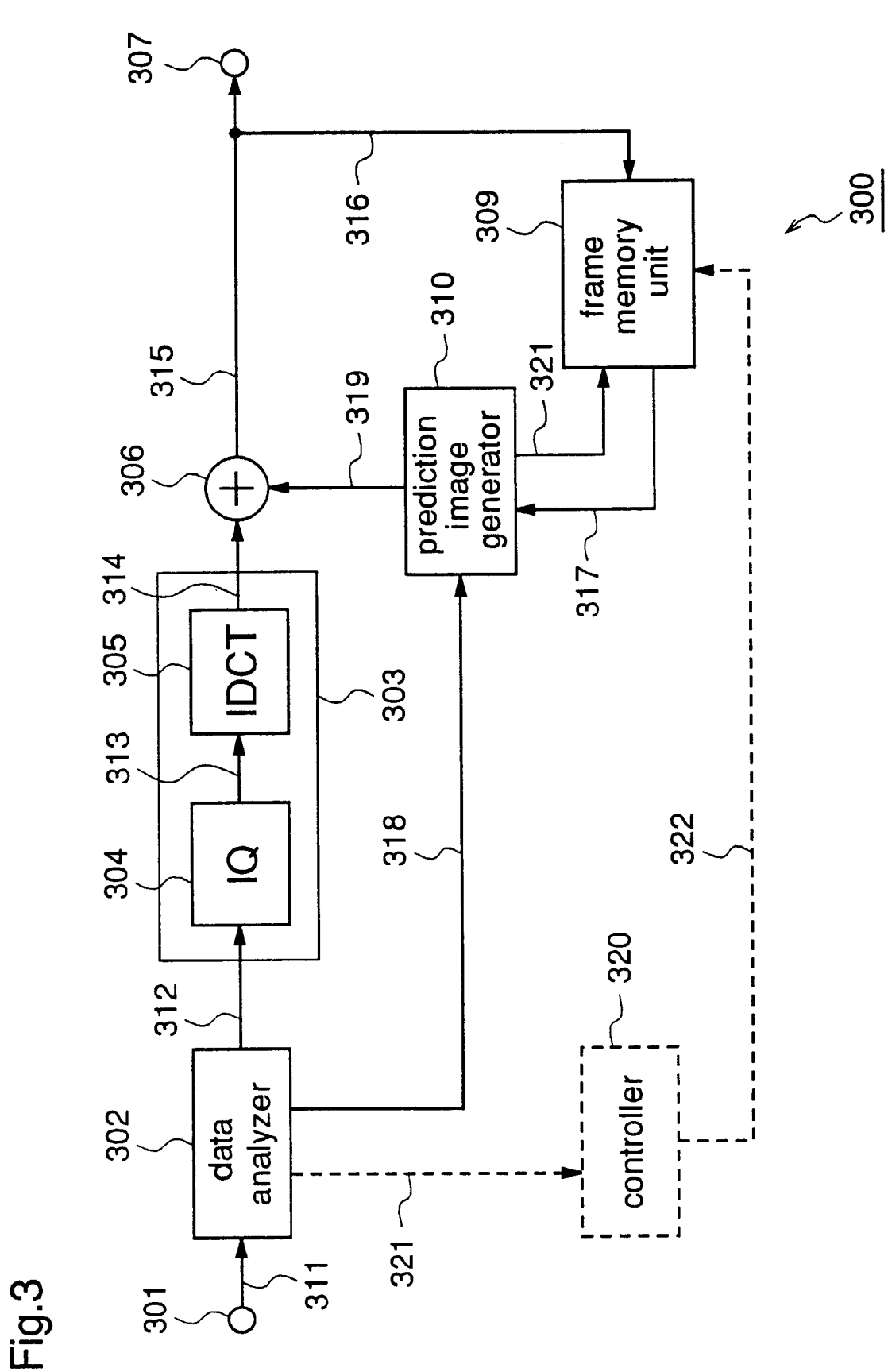
FIG. 3 is a block diagram illustrating an image predictive decoding apparatus according to the first embodiment of the invention.

FIG. 3 is a block diagram illustrating an image predictive decoding apparatus 300 according to the first embodiment of the invention.

The image predictive decoding apparatus 300 receives image data obtained by compressively coding a variable-size image by a prescribed method, and performs predictive decoding of the image data.

The image predictive decoding apparatus 300 includes a data analyzer 302, a decoder 303, and an adder 306. The data analyzer 302 analyzes the compressively coded image data, and outputs the quantization width and the DCT coefficient to the line 312, the motion vector to the line 318, and the image size to the line 321. The decoder 303 transforms the compressed block data (compressed block) from the data analyzer 302 to an expanded block by data expansion. The adder 306 adds the expanded block and the prediction block to generate a reproduced block.

Further, the image predictive decoding apparatus 300 includes a frame memory unit 309 and a prediction image generator 310. The frame memory unit 309 stored the reproduced block. The prediction image generator 310 generates an address for accessing the frame memory unit 309 on the basis of the motion vector and obtains, as a prediction block, a block corresponding to the address from the image stored in the frame memory unit 309. In this first embodiment, the prediction image generator 310 decides, as a reference image, a single reproduced image which has been recently reproduced and includes significant image content data to be referred to, on the basis of the image size from the data analyzer 302. The decision of a reference image may be carried out, as shown by dotted lines in FIG. 3, by using a controller 320 that controls the frame memory unit 309 according to the image size from the data analyzer 302. That is, the frame memory unit 309 is controlled by the controller 320 so as to select a single reproduced image which has been recently reproduced and includes significant image data to be referred to.

The decoder 303 comprises an inverse quantizer 304 that inversely quantizes the compressed block from the data analyzer 302, and an inverse discrete cosine transformer (hereinafter referred to as IDCT) 305 that performs inverse DCT (transformation of a frequency region signal to a spatial region signal) to the output from the inverse quantizer 304.

Further, reference numerals 301 and 307 designate an input terminal and an output terminal of the image predictive decoding apparatus 300.

A description is given of the operation of the image predictive decoding apparatus shown in FIG. 3.

First of all, image data (coded data) obtained by compressively coding a variable-size image in a prescribed method is input to the input terminal 301. In this first embodiment, compressive coding is carried out using motion compensation DCT as in MPEG1, so that the coded data includes the motion vector, quantization width, DCT coefficient, and data of image size.

Next, in the data analyzer 302, the compressively coded image data is analyzed, and the quantization width and the DCT coefficient are transmitted, as compressed block data, through the line 312 to the decoder 303. Further, the motion vector analyzed in the data analyzer 302 is transmitted through the line 318 to the prediction image generator 310. Likewise, the image size analyzed by the data analyzer 302 is transmitted through the like 321 to the controller 320.

In the decoder 303, the compressed block data, i.e., compressed block, are expanded by the inverse quantizer 304 and the inverse DCT transformer 305, thereby generating an expanded block 314. To be specific, the inverse quantizer 304 inversely quantizes the compressed block, and the inverse DCT transformer 305 transforms the frequency area signal to the spatial area signal, thereby generating the expanded block 314. In the prediction image generator 310, according to the motion vector transmitted through the line 318, an address 321 for accessing the frame memory unit 309 is generated, and this address 321 is input to the frame memory unit 309. Then, a prediction block 317 is generated from images stored in the frame memory unit 309. The prediction block 317 (319) and the expanded block 314 are input to the adder 306, wherein these blocks 319 and 314 are added, thereby generating a reproduced block 315. The reproduced block 315 is output from the output terminal 307 and, simultaneously, it is transmitted through the line 316 and stored in the frame memory unit 309. When intra-frame decoding is carried out, the sample values of the prediction block are all zero.

The operation of the prediction image generator 310 is identical to that already described with respect to the flowchart of FIG. 1. That is, the size of the reference image is input to the prediction image generator 310, and the reference image is decided in the prediction image generator 310. The decision of the reference image may be carried out by controlling the frame memory unit 309 according to information whether the size of the reference image is zero or not, which information is transmitted through the controller 320 and the line 322.

Figure 4:
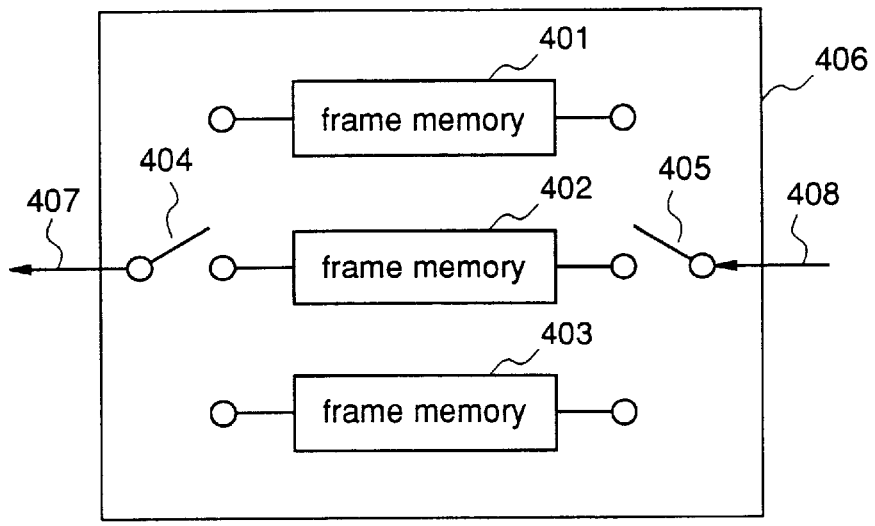
FIG. 4 is a block diagram illustrating a frame memory unit used in the image predictive decoding apparatus according to the first embodiment of the invention.

FIG. 4 is a block diagram illustrating a frame memory bank 406 as an example of the frame memory unit 309 in the image predictive decoding apparatus 300 according to the first embodiment. The frame memory bank 406 includes three frame memories 401~403. The reproduced image is stored in one of the frame memories 401~403. When generating a prediction image, these frame memories 401~403 are accessed.

In this first embodiment, the frame memory bank 406 has switches 404 and 405. The switch 405 is to select a frame memory for storing the reproduced image which is input through the line 408 (corresponding to the line 316 in FIG. 3), from the frame memories 401~403. The switch 405 selects the frame memories 401~403 one by one, controlled by the controller 320, i.e., according to the control signal 322. That is, after the first reproduced image is stored in the frame memory 401, the second reproduced image is stored in the frame memory 402. After the third reproduced image is stored in the frame memory 403, the switch 405 selects the frame memory 401. The switch 404 is connected through the line 407 (corresponding to the line 317 in FIG. 3) to the prediction image generator 310. Also this switch 404 selects the frame memories 401~403 one by one, controlled by the controller 320, i.e., according to the control signal 322. However, the switching order is changed according to the size of the reference image. For example, although the switch 404 is to be connected to the frame memory 402 for generation of a prediction image according to the given order, when the image size of the frame memory 402 is zero, the controller 320 controls the switch 404 so as to select the previous frame memory 401 (on the premise that the image size of the frame memory 401 is not zero). In this way, a prediction image can be generated from a reference image of which size is not zero. The switch 404 may be connected to plural frame memories at the same time. Further, in a unit where each frame memory is reset at every reproduction of a single image, a recently reproduced image of which size is not zero can be left in the frame memory by controlling the unit with the controller 320 so that the frame memory is not reset when the size of the reproduced image is zero. In other words, it is possible to prevent the frame memory from being updated.

While in this first embodiment the block by block motion compensation DCT method is described, the present invention is applicable to other prediction methods using, for example, global motion compensation or arbitrary lattice-shaped block motion compensation. Further, although in this first embodiment a prediction image is generated from a single reproduced image serving as a reference image, the present invention is similarly applicable to the case where a prediction image is generated from plural reference images.

As described above, according to the first embodiment of the invention, the size of a previous reference image which is input to the apparatus is detected and, when the size of the reference image is not zero, a prediction image is generated using the reference image. On the other hand, when the size of the previous reference image is zero, a prediction image is generated using a recently reproduced image of which size is not zero. Therefore, when plural objects constituting an image are subjected to compressive coding and transmitted object by object to increase the compression efficiency, it is avoided that a variable-size image which has already disappeared is used as a reference image for predictive decoding or coding, resulting in appropriate predictive decoding or coding capable of suppressing the residual signal (difference signal). Further, the coded data obtained by the image predictive coding apparatus according to this seventh embodiment can be decoded correctly by the image predictive decoding apparatus according to the second embodiment.

Embodiment 2

In the first embodiment of the invention, it is detected whether the size of the reference image is zero or not, and the reference image is decided using the detected information. However, when the fact that the image size is zero is shown by another index (e.g., one-bit flag F), control can be carried out using this index. In this second embodiment of the invention, generation of a prediction image is controlled using such index.

Figure 9:
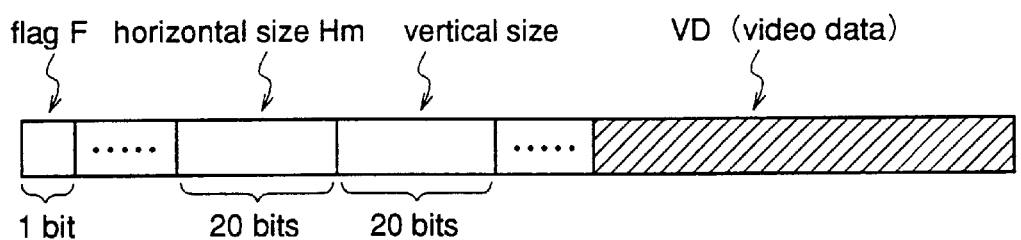
FIG. 9 is a diagram showing image data according to the second embodiment of the invention.

That is, in this second embodiment, as shown in FIG. 9, coded data of an object image includes a one-bit flag F showing that the image size is zero, i.e., the corresponding reference image is completely transparent and has no coded image content data, and this flag F is placed before the horizontal and vertical sizes Hm and Vm showing the image size. When the image size is zero, the flag F is "0". In this second embodiment, generation of a prediction image is controlled using the flag F.

Figure 8:
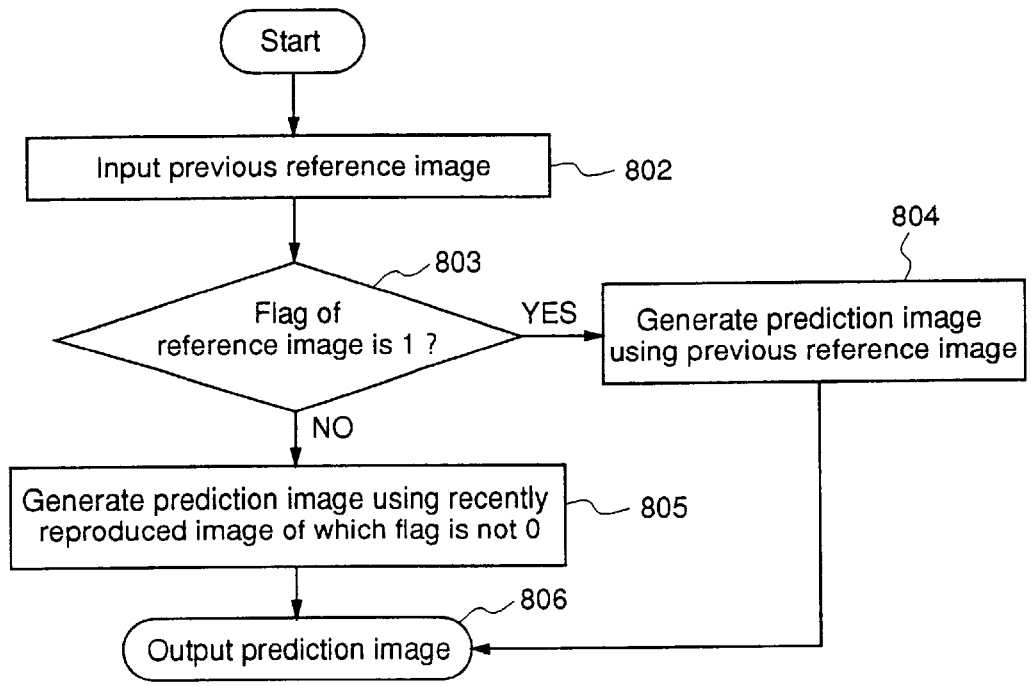
FIG. 8 is a flowchart of a prediction image generation process in an image predictive decoding method according to a second embodiment of the invention.

Hereinafter, a description is given of a prediction image generation process in the image predictive decoding method according to the second embodiment, using the flowchart of FIG. 8.

To generate a prediction image, initially, a previous reference image is input in step 802, and it is examined in step 803 whether the flag F of the reference image is "1" or not. When it is decided in step 803 that the flag F of the reference image is "1", the size of this reference image is not zero, namely, the reference image is not completely transparent and has coded image content data. So, in step 804, a prediction image is generated using the previous reference image.

When it is decided in step 803 that the flag F of the reference image is not "1", step 805 follows, wherein a prediction image is generated using, as a reference image, a recently reproduced image of which flag F is not "0".

As described above, according to the second embodiment of the invention, when plural objects constituting an image are subjected to compressive coding and transmitted object by object, it is avoided that a variable-size image which has already disappeared is used as a reference image, resulting in appropriate predictive decoding or coding capable of suppressing the residual signal (difference signal). In addition, the coded data of the object image has, at its head, a flag showing whether or not the previously reproduced image has significant coded image content data to be referred to, and the reference image is decided by detecting this flag. So, the operation of deciding the reference image is facilitated.

Embodiment 3

Figure 5:
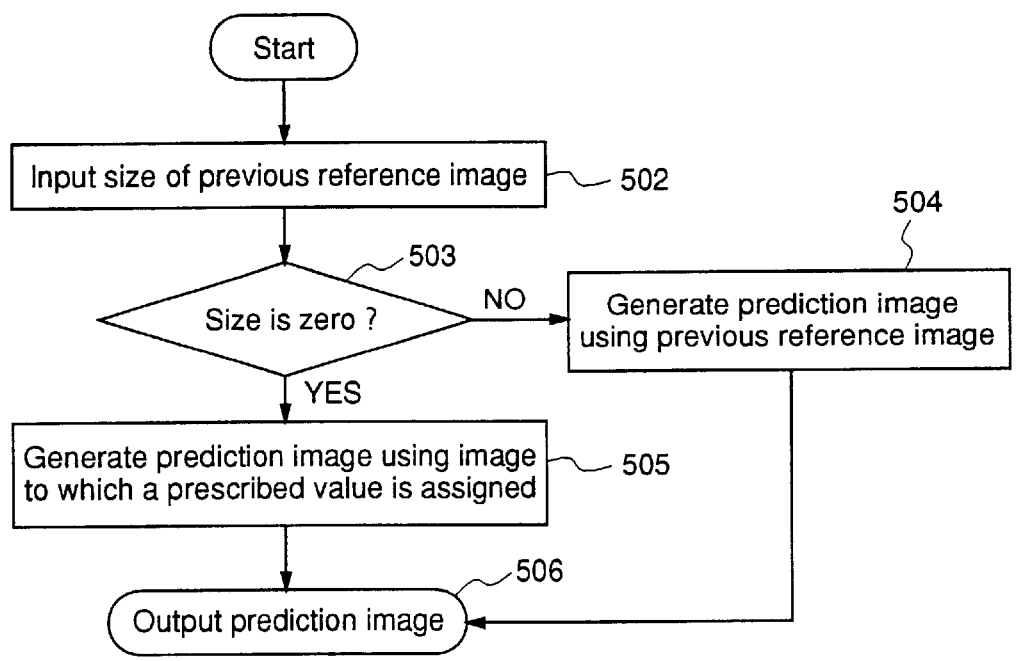
FIG. 5 is a flowchart of a prediction image generation process in an image predictive decoding method according to a third embodiment of the present invention.

FIG. 5 is a flowchart of a prediction image generation process in an image predictive decoding method according to a third embodiment of the present invention. The prediction image generation process according to this third embodiment is fundamentally identical to that according to the first embodiment except that step 505 in FIG. 5 takes the place of step 105 in FIG. 1. In step 505, when the reference image is zero or when the reference image is completely transparent (or when the flag F of the image is "0"), a prediction image to which a prescribed value is assigned, i.e., a prediction image having a prescribed value, is generated.

In this third embodiment, it is assumed that the prediction image is gray, i.e., both the luminance signal value and the color difference signal value thereof are 128. As a result, when coding, the gray block is subtracted from the block being an object of coding. When decoding, the gray block is added to the block being an object of decoding. The prescribed value mentioned above may be variable, and this value may be transmitted from the encoder to the decoder to be used for generating a prediction image.

As described above, according to the third embodiment of the invention, when plural objects constituting an image are subjected to compressive coding and transmitted object by object, it is avoided that a variable-size image which has already disappeared is used as a reference image, resulting in appropriate predictive decoding or coding capable of suppressing the residual signal (difference signal). Further, when the size of the reference image is zero, i.e., when the reference image is completely transparent, a prediction image having a prescribed value is generated. Therefore, in addition to the same effects as provided by the first embodiment, generation of the prediction image is facilitated.

Embodiment 4

Figure 10:
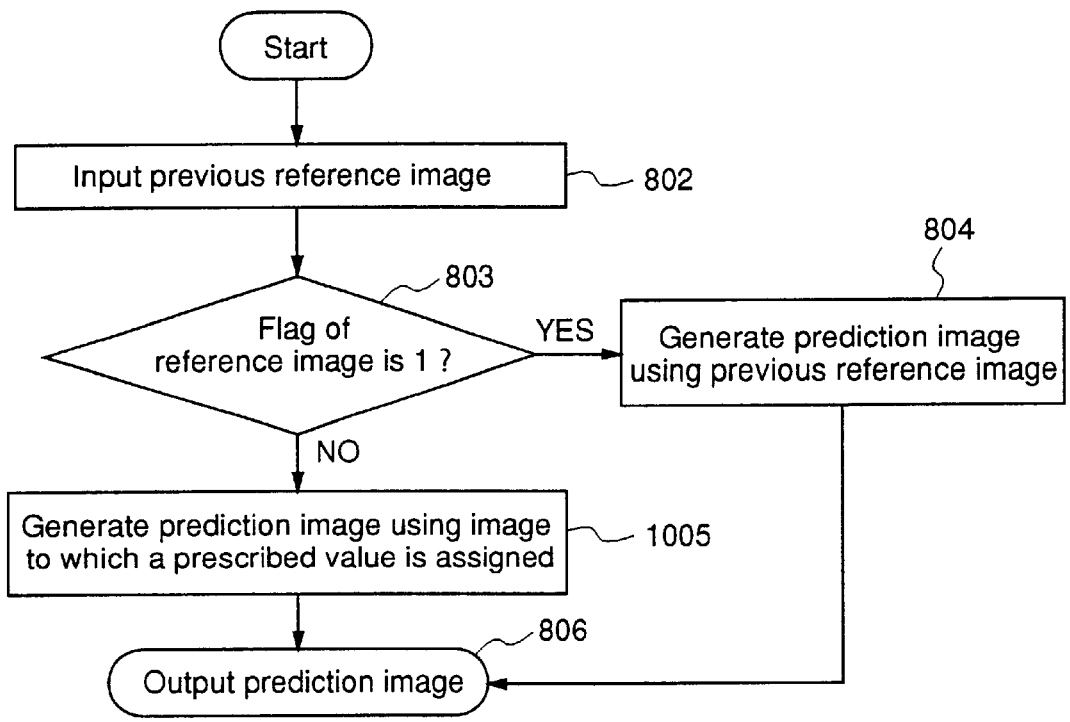
FIG. 10 is a flowchart of a prediction image generation process in an image predictive decoding method according to a fifth embodiment of the present invention.

FIG. 10 is a flowchart of a prediction image generation process in an image predictive decoding method according to a fourth embodiment of the present invention. The prediction image generation process according to this fourth embodiment is fundamentally identical to that according to the second embodiment except that step 1005 in FIG. 10 takes the place of step 805 in FIG. 8. In step 1005, when the flag F of the reference image is "0", a prediction image to which a prescribed value is assigned, i.e., a prediction image having a prescribed value, is generated.

According to the fourth embodiment of the invention, when plural objects constituting an image are subjected to compressive coding and transmitted object by object, it is avoided that a variable-size image which has already disappeared is used as a reference image, resulting in appropriate predictive decoding or coding capable of suppressing the residual signal (difference signal). Further, the coded data of the object image has, at its head, a flag showing whether or not the previously reproduced image has significant coded data to be referred to, and when it is detected that this flag is "0", a prediction image having a prescribed value is generated. Therefore, in addition to the same effects as provided by the second embodiment, generation of the prediction image is facilitated.

Embodiment 5

Figure 6:
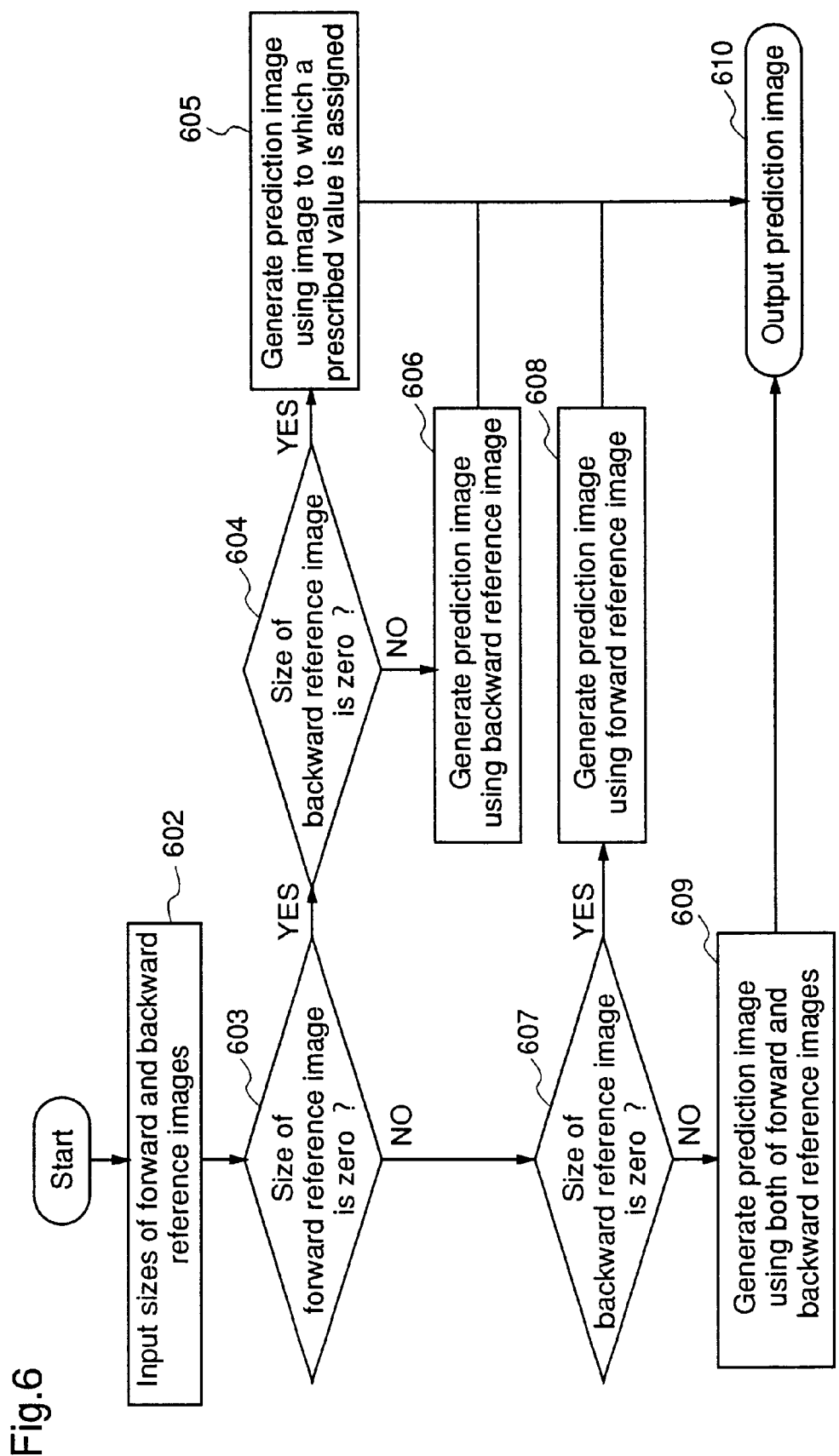
FIG. 6 is a flowchart of a prediction image generation process in an image predictive decoding method according to a fourth embodiment of the present invention.

FIG. 6 is a flowchart of a prediction image generation process in an image predictive decoding method employing bidirectional prediction, according to a fifth embodiment of the present invention. Hereinafter, a description is given of the bidirectional prediction process in the case where the reference image size is zero, i.e., when the reference image is completely transparent.

Initially, in step 602, the sizes of forward and backward reference images are input. The image #5 (205) shown in FIG. 2(a) is a bidirectional prediction image of which forward reference image and backward reference image are the image #4 (204) and the image #6 (206), respectively.

When it is decided in steps 603 and 604 that the sizes of both the forward and backward reference images are zero, an image to which a prescribed value is assigned, i.e., an image having a prescribed value, is generated as a prescribed value in step 605.

When it is decided in steps 603 and 604 that the size of the forward reference image is zero and the size of the backward reference image is not zero, a prediction image is generated using only the backward reference image in step 606.

When it is decided in steps 603 and 607 that the size of the forward reference image is not zero and the size of the backward reference image is zero, a prediction image is generated using only the forward reference image in step 608.

When it is decided in steps 603 and 607 that the sizes of both the forward and backward reference images are not zero, a prediction image is generated using these reference images.

In step 610, the generated prediction image is output. Receiving the prediction image, the encoder subtracts the prediction image from the object image, while the decoder adds the prediction image to the difference of the object image. In this way, the residual signal (difference signal) can be suppressed.

As described above, according to the fifth embodiment of the invention, in the case where plural objects constituting an image are subjected to compressive coding and transmitted object by object, when a prediction image is generated using forward and backward reference images, it is avoided that variable-size images which have already disappeared are used as the reference images, resulting in appropriate predictive decoding or coding capable of suppressing the residual signal (difference signal). Further, since a prediction image having a prescribed value is generated, generation of the prediction image is facilitated.

Embodiment 6

Figure 11:
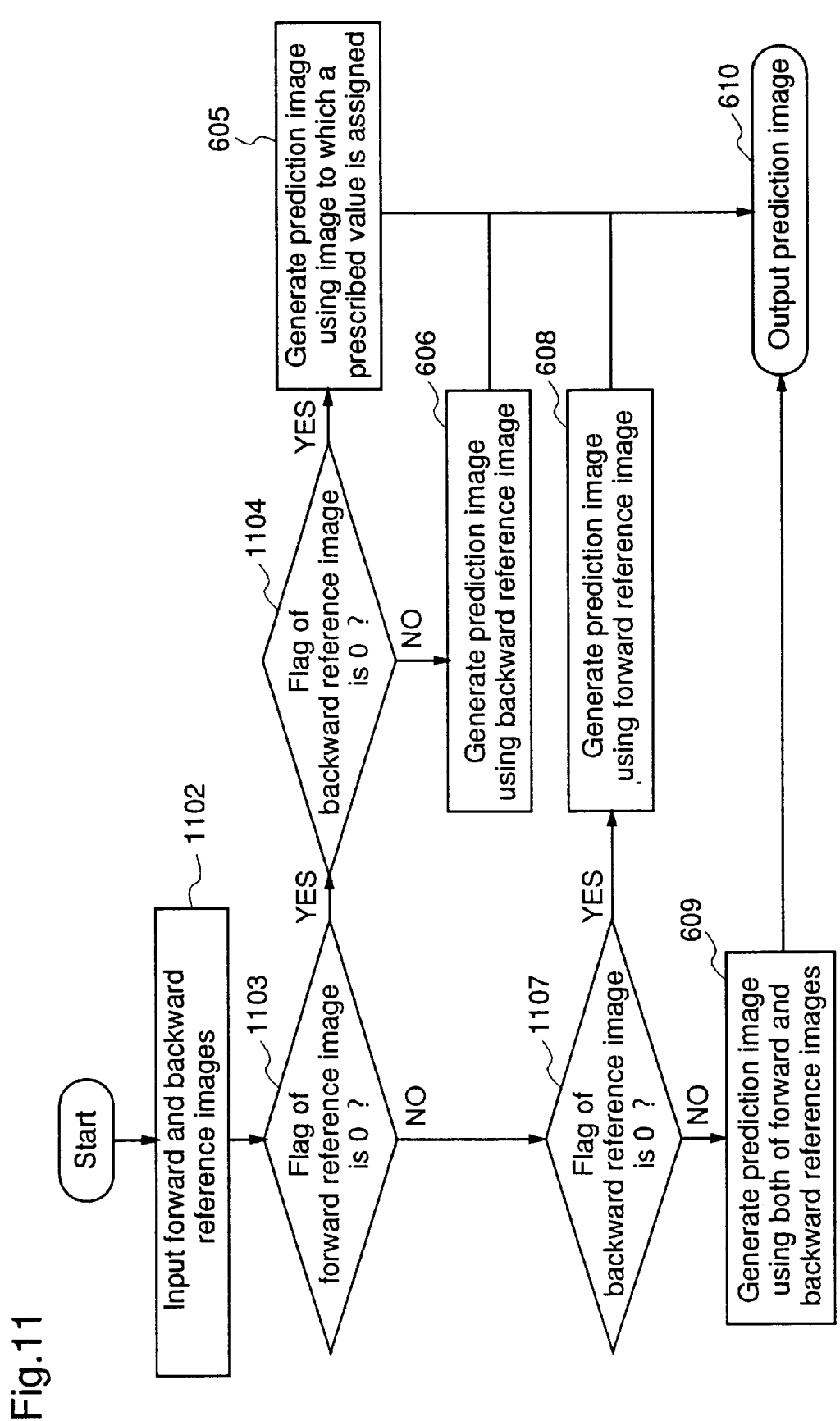
FIG. 11 is a flowchart of a prediction image generation process in an image predictive decoding method according to a sixth embodiment of the present invention.

FIG. 11 is a flowchart of a prediction image generation process in a predictive decoding method using bidirectional prediction, according to a sixth embodiment of the present invention. This sixth embodiment is fundamentally identical to the fifth embodiment, in like manner that the second and fourth embodiments are fundamentally identical to the first and third embodiments, respectively. To be specific, in this sixth embodiment, "size is zero ?" in steps 603, 604 and 607 in FIG. 6 are changed to "flag F is 0 ?" as shown in steps 1103, 1104 and 1107 in FIG. 11.

According to the sixth embodiment of the invention, in the case where plural objects constituting an image are subjected to compressive coding and transmitted object by object, when a prediction image is generated using forward and backward reference images, it is avoided that variable-size images which have already disappeared are used as the reference images, resulting in appropriate predictive decoding or coding capable of suppressing the residual signal (difference signal). Further, when it is detected that the flags F of the forward and backward reference images are "0", a prediction image having a prescribed value is generated. Therefore, detection of the variable-size image which has already disappeared is facilitated, and generation of the prediction image is facilitated.

Embodiment 7

Figure 12:
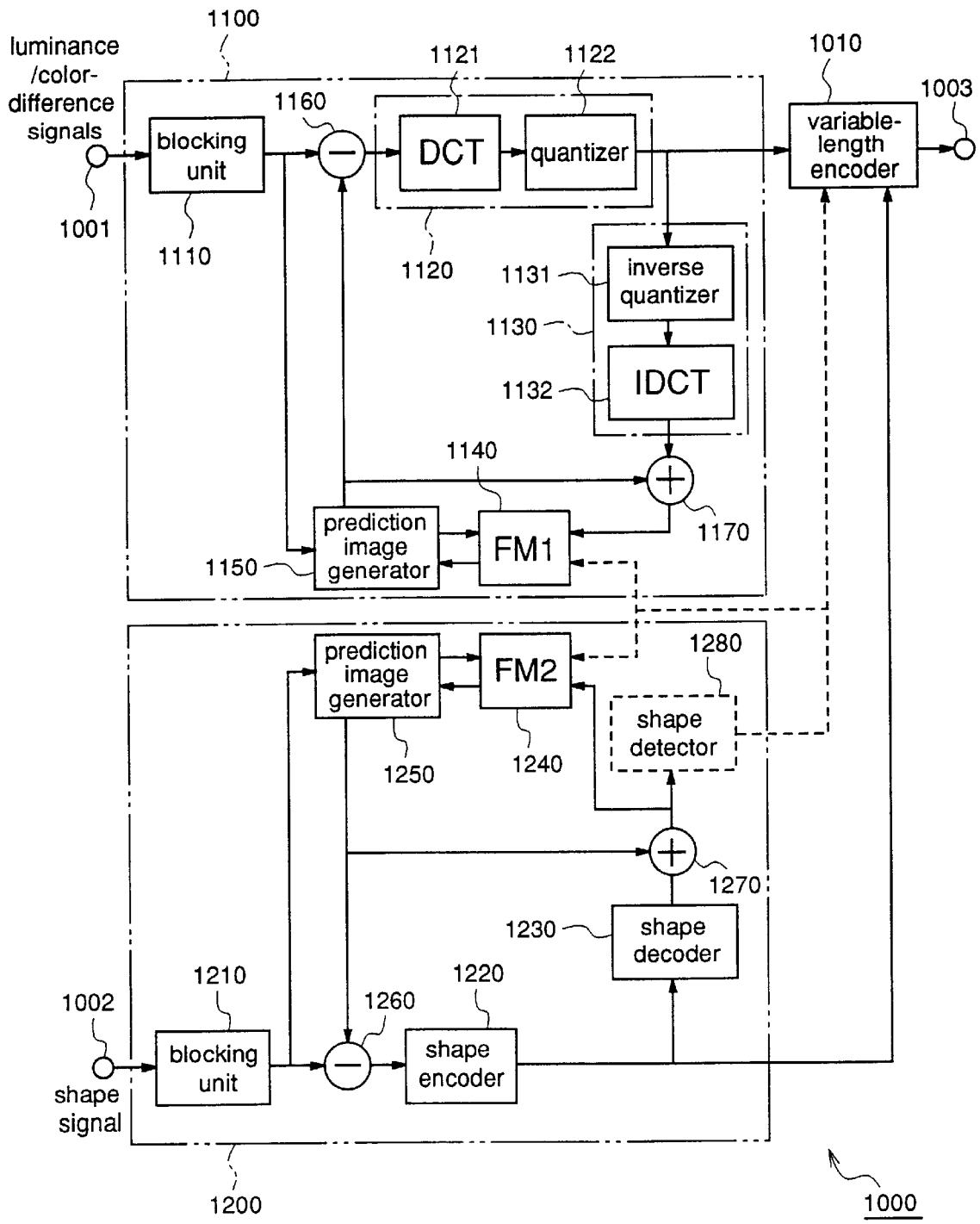
FIG. 12 is a block diagram illustrating an image predictive coding apparatus according to a seventh embodiment of the present invention.

FIG. 12 is a block diagram illustrating an image predictive coding apparatus 1000 according to a seventh embodiment of the present invention. The coding apparatus 1000 comprises a texture coding unit 1100 that performs predictive coding of a texture signal comprising a luminance signal and a color difference signal, and a shape coding unit 1200 that performs predictive coding of a shape signal.

The texture coding unit 1100 comprises a blocking unit 1110 that divides a texture signal per frame into plural macroblocks each having the size of 16×16 pixels (a unit subjected to coding) and outputs the divided texture signal; a subtracter 1160 that calculates a difference between a block being an object of coding (hereinafter, referred to as an object block) and a prediction block corresponding to the object block; a compressive encoder 1120 that compressively codes the difference; and a local decoder 1130 that expansively decodes the output from the compressive encoder 1120. The compressive encoder 1120 comprises a discrete cosine transformer (hereinafter referred to as a DCT) 1121 that performs discrete cosine transformation (DCT) of the difference, and a quantizer 1122 that quantizes the DCT coefficient. The local decoder 1130 comprises an inverse quantizer 1131 that inversely quantizes the output from the quantizer 1122, and an inverse discrete cosine transformer (hereinafter referred to as an IDCT) 1132 that performs inverse DCT (transformation of a frequency region signal to a spatial region signal) to the output from the inverse quantizer 1131.

Further, the texture coding unit 1100 includes an adder 1170 that adds an expanded block output from the IDCT 1132 and the prediction block to generate a reproduced block; a frame memory unit (FM1) 1140 that stores the reproduced block; and a prediction image generator 1150 that obtains a prediction block corresponding to the object block from images stored in the frame memory unit 1140 by motion compensation on the basis of motion information detected by a prescribed motion detection method.

The prediction image generator 1150 decides a reference image to be referred to when generating a prediction block (prediction image) from the reproduced images stored in the frame memory unit 1140 on the basis of the image size obtained from the output of the blocking unit 1110.

On the other hand, the shape coding unit 1200 comprises a blocking unit 1210 that divides a shape signal per frame into plural macroblocks each having the size of 16×16 pixels (a unit subjected to coding) and outputs the divided shape signal; a subtracter 1260 that calculates a difference between a block being an object of coding (object block) and a prediction block corresponding to the object block; a shape encoder 1220 that codes the difference by a prescribed coding method; and a shape decoder 1230 that decodes the output from the shape encoder 1220 by a decoding method corresponding to the coding method. The shape encoder 1120 codes the output from the subtracter 1260 by a coding method such as quarter tree or chain coding.

The shape coding unit 1200 further comprises an adder 1270 that adds a decoded block output from the shape decoder 1230 and the prediction block to generate a reproduced block; a frame memory unit (FM2) 1240 that stores the decoded block output from the adder 1270; and a prediction image generator 1250 that obtains a prediction block corresponding to the object block from the shape information stored in the frame memory unit 1240 by motion compensation based on the motion information detected by a prescribed motion detection method.

Further, the prediction image generator 1250 decides a reference image to be referred to when generating a prediction block (prediction image), from the reproduced images stored in the frame memory unit 1240, on the basis of the image size obtained from the output of the blocking unit 1210.

The decision of the reference image by the coding unit 1100 or 1200 may be carried out, as shown by dotted lines in FIG. 12, by using a shape detector 1280 that performs shape detection on the basis of the reproduced block, and controlling the frame memory units 1140 and 1240 according to the result of shape detection which is output from the shape detector 1280. In this case, the control of the frame memory units according to the result of shape detection is identical to the control of the frame memory unit 309 by the controller 320 according to the first embodiment. Further, the result of shape detection is applied to a variable-length encoder 1010 which is described later, and transmitted together with coded data of the texture signal and the shape signal.

Further, the image predictive coding apparatus 1000 includes a variable-length encoder 1010. The variable-length encoder 1010 performs variable-length coding of the coded texture signal output from the texture encoder 1100 and the coded shape signal and the result of shape detection, which are output from the shape encoder 1200, and multiplexes these signals to be output.

In FIG. 12, reference numeral 1001 denotes an input terminal for the texture signal, 1002 denotes an input terminal for the shape signal, and 1003 denotes an output terminal for the coded data.

A description is given of the operation.

When a texture signal (luminance/color-difference signals) and a shape signal are input to the image predictive coding apparatus 1000, the texture signal and the shape signal are divided into macroblocks (units subjected to coding) by the blocking units 1110 and 1210 included in the coding units 1100 and 1200, respectively, and prediction coding is carried out for each macroblock.

In the texture signal coding unit 1100, the subtracter 1160 calculates a difference between an object block and a prediction block, the DCT 1121 transforms this difference to a DCT coefficient, and the quantizer 1122 quantizes the DCT coefficient to generate a quantized coefficient. The quantized coefficient is output toward the variable-length encoder 1010.

The inverse quantizer 1131 inversely quantizes the quantized coefficient to generate a DCT coefficient, and the IDCT 1130 transforms the DCT coefficient to an expanded block corresponding to the object block by a process of transforming frequency region data to spatial region data. Further, the adder 1170 adds the expanded block and the prediction block to generate a reproduced block. The reproduced block is stored in the frame memory unit 1140. At this time, the prediction image generator 1150 generates a prediction block corresponding to the object block, from the images stored in the frame memory unit 1140, by motion compensation on the basis of motion information detected by a prescribed motion detection method. Further, the prediction image generator 1150 decides, as a reference image, a single reproduced image which has been recently reproduced and includes significant image data to be referred to, from the reproduced images stored in the frame memory unit 1140. When the apparatus is provided with the shape detector 1280, the decision of the reference image can be performed by controlling the frame memory unit 1140 according to the output from the shape detector 1280, i.e., information whether the size of the reproduced image to be referred to is zero or not.

In parallel with the processing of the texture encoder 1100, in the shape encoder 1200, predictive coding of the shape signal is carried out in similar manner to the above-described predictive coding of the texture signal. That is, a difference between the object block and the prediction block is obtained by the subtracter 1260, and this difference is coded by a coding method such as quarter tree or chain coding in the shape encoder 1220, and the coding result is output toward the variable-length encoder 1010. Further, the coded shape signal from the shape encoder 1220 is restored by the shape decoder 1230, and the restored block and the prediction block are added by the adder 1270 to generate a reproduced block.

The reproduced block output from the adder 1270 is stored in the frame memory unit 1240. In the prediction image generator 1250, a prediction block corresponding to the object block is generated from the shape information stored in the frame memory unit 1240, by motion compensation based on motion information detected by a prescribed motion detection method. Further, in the prediction image generator 1250, a single reproduced image which has been recently reproduced and includes significant image data to be referred to is decided as a reference image, from the reproduced images stored in the frame memory unit 1240, on the basis of the image size obtained from the output of the blocking unit 1210.

When the apparatus is provided with the shape detector 1280, the decision of the reference image can be performed by controlling the frame memory unit 1240 according to the output from the shape detector 1280, i.e., information whether the size of the reproduced image to be referred to is zero or not. In this case, the reproduced block is input to the shape detector 1280 wherein shape detection is carried out. For example, assuming that the shape signal is a binary signal, when there is only black data between white data and black data as shape data, no reproduced data exists. At this time, there is no texture signal corresponding to the shape signal of this block. In this case, as described above, a flag showing "no coded data" or data showing "image size is zero" is output from the shape detector 1280 toward the frame memory units 1140 and 1240 and the variable-length encoder 1010. In the frame memory units 1140 and 1240, according to the output from the shape detector 1280, control is carried out in similar manner to the control of the frame memory unit 309 by the controller 320 according to the first embodiment.

As described above, according to the seventh embodiment of the present invention, in the coding unit 1100 (1200), a single reproduced signal which has been recently reproduced and includes significant image data to be referred to is decided as a reference image from the reproduced images stored in the frame memory unit 1140 (1210) according to the image size obtained from the output of the blocking unit 1110 (1210). Therefore, when plural objects constituting an image are subjected to compressive coding and transmitted object by object, it is avoided that a variable-size image which has already disappeared is used as a reference image for predictive coding, whereby appropriate predictive coding that can suppress the residual signal (difference signal) is carried out. Further, the coded data obtained by the image predictive coding apparatus according to this seventh embodiment can be decoded correctly by the image predictive decoding apparatus according to the second embodiment.

Further, when the apparatus includes the shape detector 1280, the decision whether a reference image corresponding to the input object block exists or not is performed by detecting the shape of the reproduced block of the shape signal, in the shape coding unit 1200. When the reproduced block has no shape, in the texture encoder and the shape encoder, a prediction block is generated using a reproduced block which has been recently reproduced and has a shape, instead of the reproduced block corresponding to the object block. Therefore, when plural objects constituting an image are subjected to compressive coding and transmitted object by object, it is avoided that a variable-size image which has already disappeared is used as a reference image for predictive coding, whereby appropriate predictive coding is carried out. Also in this case, the coded data obtained by the image predictive coding apparatus according to this seventh embodiment can be decoded correctly by the image predictive decoding apparatus according to the second embodiment. That is, in the image predictive decoding apparatus, the data analyzer 302 controls the frame memory unit 309 on the basis of the output from the shape detector 1280. Therefore, when coded data obtained by object by object predictive coding is decoded, it is avoided that a variable-size image which has already disappeared is used as a reference image for predictive decoding, whereby appropriate predictive decoding is carried out.

In this seventh embodiment, the selection of the reproduced image as a reference image by the prediction image generator 1150 (1250) or the control of the frame memory unit 1140 (1240) according to the result of shape detection is carried out in the same manner as the selection of the reproduced image as a reference image by the prediction image generator 1150 (1250) or the control of the frame memory unit 309 by the controller 320 according to the first embodiment, respectively. However, the present invention is not restricted thereto.

For example, when there is no image data to be referred to in a frame previous to the object frame, a prediction image having a prescribed value may be generated as described for the third embodiment. In this case, as an image predictive decoding apparatus corresponding to the image predictive coding apparatus, an apparatus that performs the image predictive decoding process according to the third embodiment is employed.

Further, the prediction according to this seventh embodiment may be bidirectional prediction as described for the fifth embodiment. In this case, as an image predictive decoding apparatus corresponding to the image predictive coding apparatus, an apparatus that performs the image predictive decoding process according to the fifth embodiment is employed.

Embodiment 8

Figure 13:
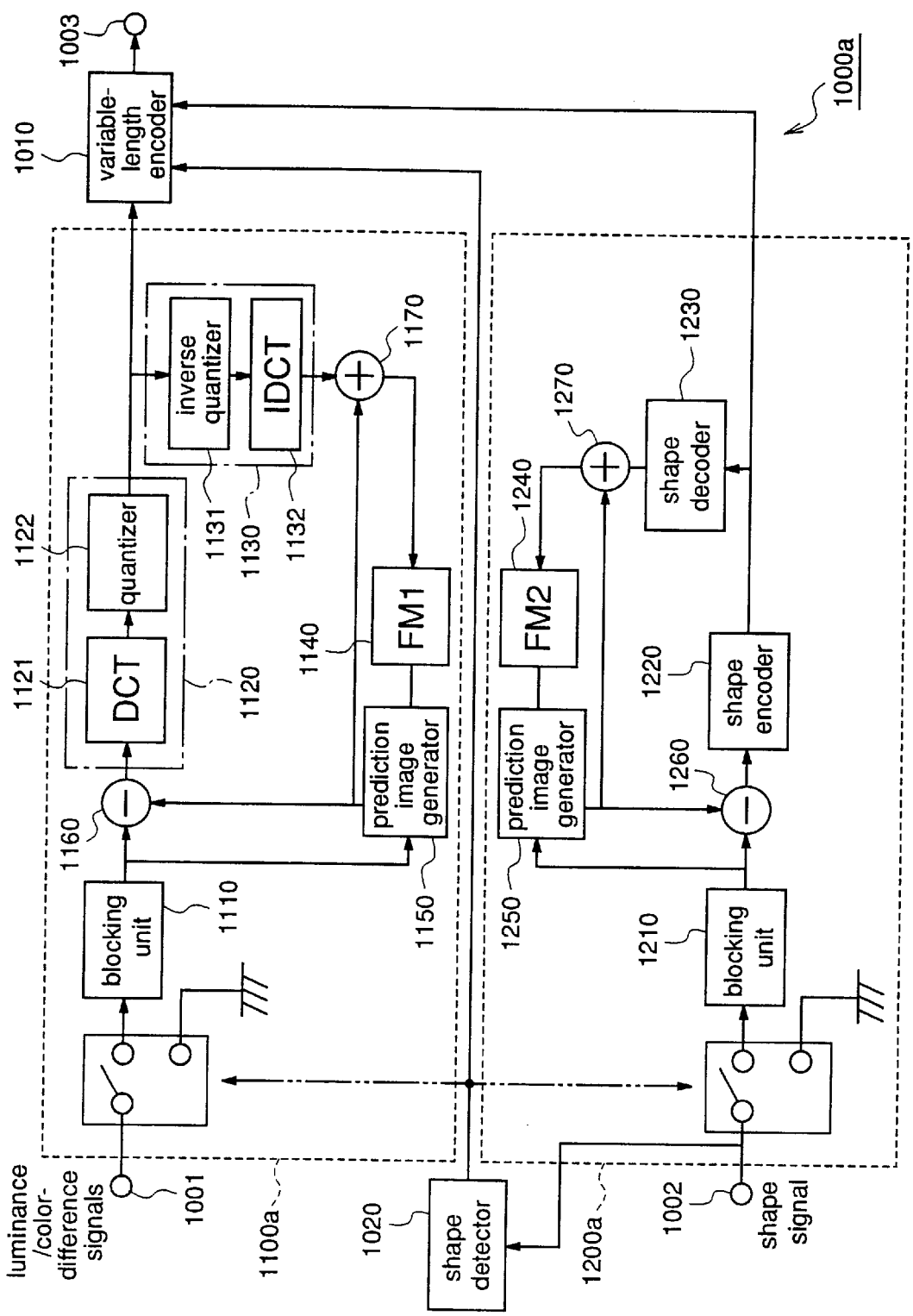
FIG. 13 is a block diagram illustrating an image predictive coding apparatus according to an eighth embodiment of the present invention.

FIG. 13 is a block diagram illustrating an image predictive coding apparatus 1000a according to an eighth embodiment of the present invention. The coding apparatus 1000a comprises a texture coding unit 1100a that performs predictive coding of a texture signal comprising a luminance signal and a color difference signal, and a shape coding unit 1200a that performs predictive coding of a shape signal.

The texture coding unit 1100a is different from the texture coding unit 1100 according to the seventh embodiment only in that a switch 1190 is connected between the input terminal 1001 and the blocking unit 1110, which switch connects (supplies) the texture signal to either of the blocking unit 1110 and the ground, according to a control signal.

The shape coding unit 1200a is different from the shape coding unit 1200 according to the seventh embodiment only in that it does not include the shape detector 1280, and a switch 1290 is connected between the input terminal 1002 and the blocking unit 1210, which switch connects (supplies) the shape signal to either of the blocking unit 1210 and the ground, according to a control signal.

The image predictive coding apparatus 1000a further includes a shape detector 1020 that receives the shape signal and outputs the result of shape detection toward the switches 1190 and 1290 as the control signal. When it is detected by the shape detector 1020 that the input shape signal has no shape, the switch 1190 (1290) connects the texture signal (shape signal) to the ground. Conversely, when the input shape signal has a shape, the switch 1190 (1290) connects the texture signal (shape signal) to the blocking unit 1110 (1210). The result of shape detection is subjected to variable-length coding by the variable-length encoder 1010, together with the coded data from the coding units 1100a and 1200a.

A description is now given of the operation of the image predictive coding apparatus 1000a according to this eighth embodiment. The operation of the apparatus 1000a is identical to the operation already described for the seventh embodiment except that the switches 1190 and 1290 are controlled by the shape detector 1020.

To be specific, when the texture signal and the shape signal are input, the shape detector 1020 detects whether the input shape signal has a shape or not. When the shape signal does not have a shape, the switches 1190 and 1290 are controlled by the output from the shape detector 1020 so that the texture signal and the shape signal are supplied to the ground. That is, at this time, the texture signal and the shape signal are not subjected to predictive coding, and the result of shape detection by the shape detector 1020 is supplied to the variable-length encoder 1010.

On the other hand, when it is detected that the input shape signal has a shape, the switches 1190 and 1290 are controlled by the output from the shape detector 1020, and the texture signal and the shape signal are input to the blocking units 1110 and 1210, respectively, wherein these signals are subjected to predictive coding. The result of shape detection by the shape detector 1020 is supplied to the variable-length encoder 1010, together with the outputs from the coding units 1100a and 1200a.

As described above, according to the eighth embodiment of the present invention, the image predictive coding apparatus includes the shape detector 1020 that detects whether the input shape signal has a shape or not. When the shape signal has a shape, the texture signal and the shape signal are subjected to predictive coding, and when the shape signal does not have a shape, the texture signal and the shape signal are not subjected to predictive coding. Therefore, when plural objects constituting an image are subjected to compressive coding and transmitted object by object, it is avoided that a variable-size image which has already disappeared is used as a reference image for predictive coding, whereby appropriate predictive coding that can suppress the residual signal (difference signal) is carried out.

Further, since the result of shape detection by the shape detector 1020 is coded and transmitted, an image predictive decoding apparatus that receives the result of shape detection can appropriately perform prediction decoding of a variable-size image that has already disappeared, using the result of shape detection as a synchronous signal. That is, while the variable-size image disappears, reproduction of coded data corresponding to this image is stopped.

Furthermore, when a program for implementing the image predictive decoding method (apparatus) or the image predictive coding method (apparatus) according to any of the aforementioned embodiments of the invention is recorded in a storage medium such as a floppy disk, the image processing according to the embodiment can be executed easily in an independent computer system.

Figure 14:
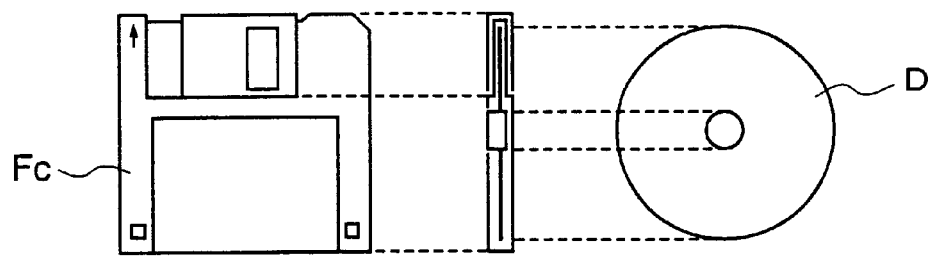
FIGS. 14(a)–14(c) are diagrams for explaining a data storage medium which contains a program for implementing image processing by a computer, which image processing is one of the methods and apparatuses according to the first to eighth embodiments of the invention.
Figure 14:
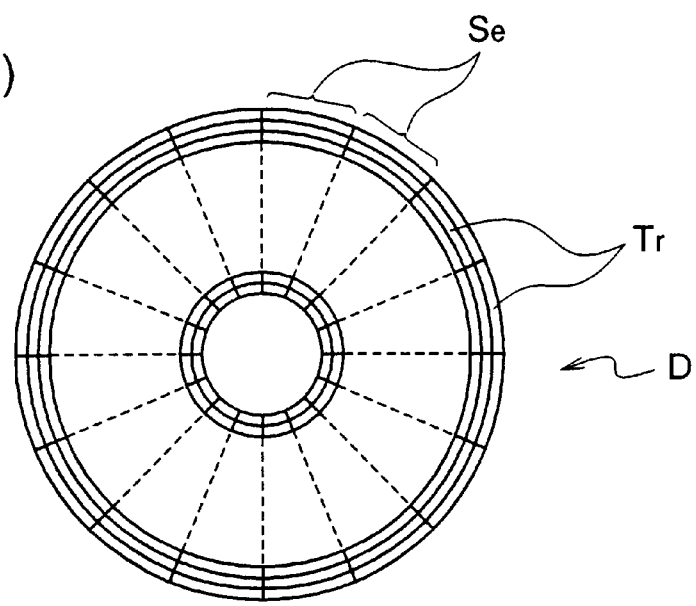
Figure 14:
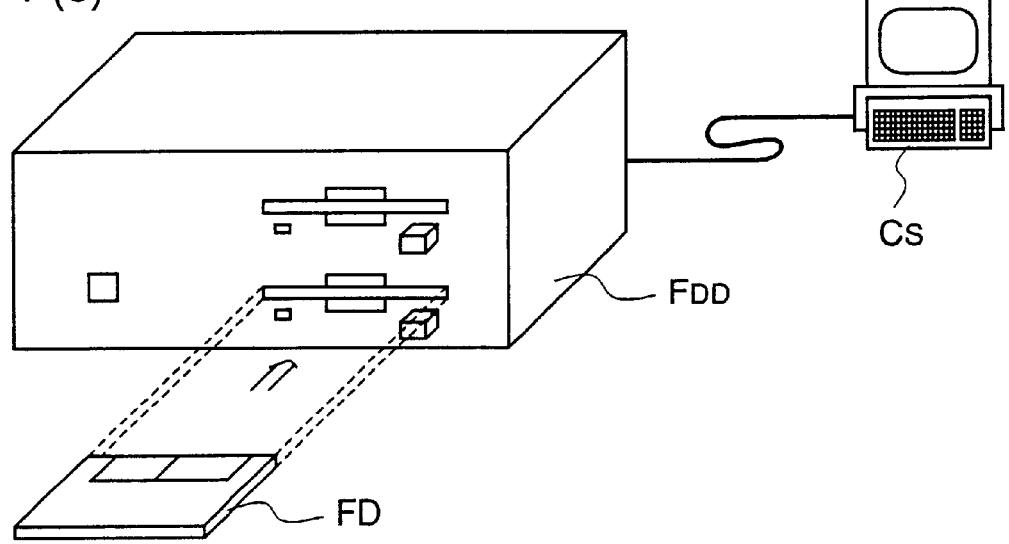

FIGS. 14(a)–14(c) are diagrams for explaining the case where the image predictive decoding process or the image predictive coding process according to any of the aforementioned embodiments is executed by a computer system using a floppy disk which contains a program corresponding to the process.

FIG. 14(a) shows a front view of a floppy disk FD, a cross-sectional view thereof, and a floppy disk body D as a storage medium. FIG. 14(b) shows an example of a physical formation of the floppy disk body D. The floppy disk body D is contained in a case FC. On the surface of the disk body D, a plurality of tracks Tr are formed concentrically from the outer circumference of the disk toward the inner circumference. Each track is divided into 16 sectors in the angular direction. Therefore, in the floppy disk body D containing the above-mentioned program, data of the program are recorded on assigned regions of the floppy disk body D.

FIG. 14(c) shows the structure for recording/reproducing the program in/from the floppy disk FD, wherein Cs is a computer system and FDD is a floppy disk drive. When the program is recorded in the floppy disk FD, data of the program are written in the floppy disk FD from the computer system Cs through the floppy disk drive FDD. When the above-mentioned image predictive decoding process or the image predictive coding process is constructed in the computer system Cs from the program in the floppy disk FD, the program is read from the floppy disk FD by the floppy disk drive FDD and transmitted to the computer system Cs.

Although in the above description emphasis has been placed on a data storage medium containing a program for performing an image predictive decoding process or an image predictive coding process according to any of the aforementioned embodiments, a data storage medium containing coded image data according to any of the aforementioned embodiments is also within the scope of the invention.

Furthermore, although in the above description emphasis has been placed on image processing by a computer system using a floppy disk as a data storage medium, similar image processing can be carried out using other storage media, such as an IC card and a ROM cassette, as long as the program of the image processing can be recorded in the media.

What is claimed is:

1. An image predictive decoding method for decoding a first coded frame obtained by coding an image, comprising:

determining whether or not a second coded frame, which occurs before the first coded frame in a display order, includes image content data, said second coded frame including a flag indicating whether or not said second coded frame includes image content data, said determination being based upon an indication provided by said flag;

generating a prediction image, by using, as a reference image, a reproduced image corresponding to the second coded frame when the second coded frame includes image content data, and when the second coded frame does not include image content data, by using as a reference image, a reproduced image corresponding to a third coded frame which includes image content data and occurs before the second coded frame in a display order; and decoding the first coded frame by predictive decoding using the generated prediction image.

2. The image predictive decoding method of claim 1, wherein said image includes an arbitrarily shaped object whose size is variable.

* * * * *